United States Patent [19]

Schaub et al.

[11] 3,812,410

[45] May 21, 1974

[54] CIRCUIT FOR REGULATING THE SPEED OF A DIRECT CURRENT MOTOR

[75] Inventors: Gerhard Schaub; Karl Schramm, both of Nurnberg, Germany

[73] Assignee: Gebr. Buhler Nachfolger GmbH, Nurnberg, Germany

[22] Filed: Dec. 28, 1970

[21] Appl. No.: 102,010

[30] Foreign Application Priority Data
Jan. 7, 1970  Germany.......................... 2000497

[52] U.S. Cl.............. 318/328, 318/138, 318/345, 318/341
[51] Int. Cl. .................................... H02p 5/00
[58] Field of Search .......... 318/138, 696, 341, 599, 318/345, 326, 327, 608

[56] References Cited
UNITED STATES PATENTS

| | | | |
|---|---|---|---|
| 2,588,743 | 3/1952 | McCallum | 318/608 |
| 2,588,742 | 3/1952 | McCallum | 318/608 |
| 2,780,763 | 2/1957 | Hertwig | 318/341 X |
| 3,577,057 | 5/1971 | Dyer | 318/341 |
| 3,441,827 | 4/1969 | Payne | 318/341 |
| 3,617,845 | 11/1971 | McKenna | 318/341 |
| 3,408,548 | 10/1968 | Cola | 318/138 |
| 3,624,476 | 11/1971 | Bruscaglioni | 318/345 |
| 2,809,339 | 10/1957 | Guggi | 318/327 |
| 3,523,228 | 8/1970 | Currie et al. | 318/599 |
| 3,181,046 | 4/1965 | Sutton | 318/599 |
| 3,079,539 | 2/1963 | Guerth | 318/599 |
| 3,003,096 | 10/1961 | DuBois | 318/599 |
| 3,436,629 | 4/1969 | Adler | 318/599 X |
| 3,553,551 | 7/1971 | Arnold | 318/327 |

*Primary Examiner*—G. R. Simmons
*Attorney, Agent, or Firm*—Michael S. Striker

[57] ABSTRACT

The ratio between the two states of an astable multivibrator is varied in dependence on the difference between a reference voltage and the output of an alternating current generator driven by the motor, a speed of which is to be regulated. One output of the multivibrator is connected to control the conductivity of a power transistor that controls the flow of current to the motor.

8 Claims, 1 Drawing Figure

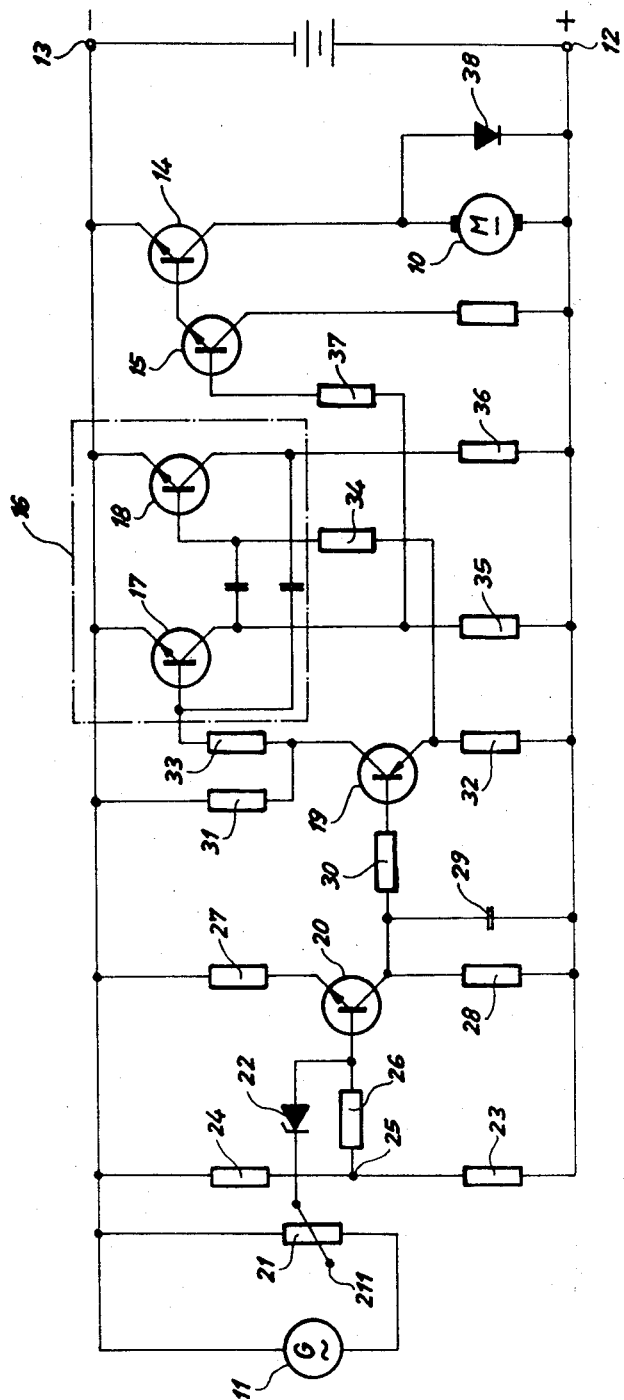

CIRCUIT FOR REGULATING THE SPEED OF A DIRECT CURRENT MOTOR

BACKGROUND OF THE INVENTION

The invention relates to a circuit for regulating the rpm of a direct current motor, particularly a motor energized from a battery. The motor drives a generator, which is advantageously mounted on the motor shaft to form, with the motor, a single unit.

Among prior art circuits of this kind is a circuit for obtaining a desired rpm over a great range of battery voltages. The circuit uses very little current of itself, virtually all of the battery power being used for the motor. This circuit was chiefly developed for motors operating at only one speed that must be closely held.

If the direct current, battery-operated, motor is to be used in tape recorders and players, the ratio between desired motor speeds may be as great as 1:4. In this case, the winding of the motor must be so designed that at the highest rpm the motor terminal voltage is still smaller than the supply voltage. At the lowest rpm, the difference between the supply voltage and the terminal voltage is very large, because the terminal voltage is proportional to rpm. This difference is usually nullified by a transistor circuit, which fact, with battery operation, entails an unacceptably low efficiency.

SUMMARY OF THE INVENTION

An object of the invention is a motor speed regulating circuit for direct current motors, which circuit ensures good speed control, low wow and flutter, and little electrical noise.

A further object of the invention is a circuit of the aforesaid object, which circuit enables the motor to run at different, well-regulated, speeds. The invention consists essentially of a generator driven by the motor and having an output voltage, a source of direct current for the motor, means for producing a reference voltage, means for obtaining a difference voltage that is the difference between the reference voltage and the generator output voltage, an astable multivibrator having output means and being connected to the difference voltage so that the value of the latter controls the ratio between the two astable states of the multivibrator, the output means of the astable multivibrator being connected to the motor so that electrical energy is supplied to the latter in dependence on the ratio so as to maintain a constant motor speed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows the circuit of the invention.

DESCRIPTION OF THE PREFERRED EMBODIMENT

With reference to the FIGURE, the shaft of the direct current motor 10 is connected, in a manner not shown, to an alternating current generator 11. The reference numerals 12 and 13 respectively denote the positive and negative terminals of a battery. The winding of the direct current motor 10 is connected in series with the emitter collector path of a power transistor 14, the series arrangement of the windng and the path being connected between the battery terminals 12 and 13. The power transistor 14 is driven by a transistor 15, the emitter of which is connected to the base of the power transistor.

A conventional astable multivibrator 16, enclosed by the dot-dash lines, has two transistors 17 and 18. Connected to one input of the astable multivibrator is an amplifying stage having a control transistor 19, the conduction of which is controlled by a stage that compares a varying voltage with a reference voltage, this comparator stage being connected to the generator 11 and having a rectifying and amplifying transistor 20. The voltage comparator stage comprises, moreover, a potentiometer 21 connected across the output of the alternating current generator 11, a Zener diode 22 connected between the potentiometer tap 211 and the base of the transistor 20, two series-connected resistors 23 and 24 shunted across the battery terminals 12 and 13 and acting as a voltage divider, and a resistor 26 connected between the base of the transistor 20 and the tap 25 of the voltage divider. The resistor 26 can also be connected directly to one terminal of the battery.

Respective resistors 27 and 28 connect the emitter-collector path of the transistor 20 across the battery terminals. A capacitor 29 and a resistor 28, for filtering out the ripple frequency of the generator 11, are connected in parallel between the collector of the transistor 20 and the positive terminal of the battery.

A resistor 30 connects the transistor 20 of the voltage comparator stage to the control transistor 19 of the amplifying stage. The emitter-collector path of the control transistor is connected between the battery terminals by respective resistors 31 and 32. A resistor 33 connects the collector of transistor 19 to one input — the base of transistor 17 — of the astable multivibrator, the emitter of transistor 19 being connected by a resistor 34 to the other input, the base of transistor 18. Each of the two outputs of the astable multivibrator is capacitively coupled to the base of the other transistor of the multivibrator; resistors 35 and 36 connect respective ones of these inputs to the positive terminal 12 of the battery. One of the multivibrator outputs — the collector of transistor 17 — is connected by a coupling resistor 37 to the base of the driver transistor 15 for the power transistor 14.

Shunted across the direct current motor 10 is a diode 38, which prevents the appearance of induced voltage peaks that otherwise would occur because the motor is energized in pulses. The induced voltage peaks would deleteriously affect the speed constancy of the motor.

The circuit described operates in the following manner. The voltage at the tap 25 is dependent on the battery voltage, and the voltage at the tap 211 of the potentiometer is dependent on the speed of the alternating current generator 11, which is coupled to the shaft of the direct current motor 10. The difference in the voltages at the taps 25 and 211 determine the conductivity of the transistor 20. In dependence on this voltage difference, the transistor 20 regulates the conductivity of the transistor 19, which in turn controls the ratio between the two states of the astable multivibrator 16, which is designed for a determined fundamental operating frequency. This ratio is varied in dependence on the size and direction of the control signal delivered by the transistor 20.

Only one state of the multivibrator controls the conductivity of the power transistor 14. When the ratio between the two states is changed, the length of time that the transistor 17 is on and off is changed, thereby, of course, also changing the period during which the transistor 18 is off and on. The result is that the resistor 37 conducts to the base of the driver 15 a voltage pulse of varying width, which controls the length of time that the power transistor 14 is on and off, and thereby regulates the speed of the direct current motor 10.

When the speed of the motor 10 exceeds a certain desired rpm, the motor is only periodically fed with current. The electrical energy fed to the motor is thus reduced without, however, being uselessly converted into heat energy taken from the battery, as is the case with many motor speed regulators of the prior art.

Since the design frequency of the astable multivibrator 16 is high compared to the rpm of the generator 11, the motor is driven at a constant speed even though it is energized by pulses. The shunt diode 38 also helps to ensure that the motor not only runs at a predetermined rpm, but that it also is satisfactorily free of wow and flutter.

The circuit of the invention is advantageously designed so that the fundamental frequency of the multivibrator is several times the rpm of the alternating current generator. If the latter turns at several hundred revolutions per minute, the frequency of the multivibrator will be several thousand cycles, for example. The direct current motors for which the invention is intended are usually very small and have little flywheel action. The high fundamental frequency of the multivibrator ensures, as previously noted, that the uniform speed of the motor is unaffected by the pulsed energization of the motor. If the motor is used in a tape recorder or in a tape play-back machine, an application that demands constant motor speed with low wow and flutter, the circuit of the invention ensures that noise from either the motor or the circuit is not introduced into the audio circuit of the tape machine. The frequency of the multivibrator can be chosen as desired, thereby permitting the circuit to be adapted to various kinds of special uses.

The speed regulating circuit of the invention ensures extremely efficient use of the power stored in the battery, because very little power is used by the regulating circuit itself.

The motor is easily switched to different speeds by using a potentiometer 21 for each speed, the desired potentiometer being connected to the Zener diode 22 by a multi contact switch.

It will be understood that each of the elements described above, or two or more together, may also find a useful application in other types of circuits differing from the types described above.

Wile the invention has been illustrated and described as embodied in a circuit for regulating the speed of a direct current motor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for regulating the speed of a D.C. motor, comprising in combination speed-monitoring means for generating an electrical monitoring signal whose magnitude is indicative of the actual speed of the motor; reference-signal means for furnishing an electrical reference signal whose magnitude is indicative of the desired speed of the motor; error-signal means for furnishing an electrical error signal whose magnitude corresponds to the magnitude difference between said monitoring signal and said reference signal; and astable multivibrator means having control input means connected to said error-signal means and operative for varying the ratio of the time duration of the two astable states of said multivibrator means as a function of the magnitude of said error signal; and source means for furnishing current to the motor when said multivibrator means is in a predetermined one of said two astable states thereof.

2. An arrangement as defined in claim 1, wherein said monitoring means comprises a tachometer generator mechanically coupled to the motor, and wherein the frequency of said astable multivibrator means is at least several times greater than the rotational speed of said tachometer generator.

3. An arrangement as defined in claim 1, wherein said control input means of said multivibrator means comprises two electrical inputs each operative for receiving signals for varying the time duration of a respective one of said two states of said multivibrator means, and wherein said source means comprises a D.C. voltage source, and wherein said error-signal means comprises a control transistor having an emitter-collector path connected across said voltage source and having an emitter connected to one of said inputs and a collector connected to the other of said inputs, and a base, and wherein said error-signal means also includes means for applying to said base a voltage corresponding to the difference between said monitoring signal and said reference signal.

4. An arrangement as defined in claim 3, wherein said error-signal means includes an amplifying and rectifying transistor stage including a transistor whose collector is connected to said base of said control transistor and whose base is connected via a Zener diode to the output of said monitoring means and also via a resistor to the output of said reference-signal means.

5. An arrangement as defined in claim 4, wherein said reference-signal means comprises a voltage divider connected across said voltage source and having a tap constituting the output of said reference-signal means.

6. An arrangement as defined in claim 4, wherein said monitoring means comprises a tachometer generator mechanically coupled to the motor and a potentiometer connected across said generator and having a tap constituting the output of said monitoring means.

7. An arrangement as defined in claim 1, wherein said source means comprises a voltage source, a power transistor having an emitter-collector path connected in series with the motor, the series connection of said transistor and the motor being connected across said voltage source, and a driver tansistor for driving said power transistor and having a base connected to the output of said astable multivibrator means.

8. An arrangement as defined in claim 1; and further including a diode connected directly across the terminals of the motor.

* * * * *